(12) United States Patent
Weinstein-Raun (10) Patent No.: US 10,732,625 B2
(45) Date of Patent: Aug. 4, 2020

(54) AUTONOMOUS VEHICLE OPERATIONS WITH AUTOMATED ASSISTANCE

(71) Applicant: GM GLOBAL TECHNOLOGY OPERATIONS LLC, Detroit, MI (US)

(72) Inventor: Benjamin Weinstein-Raun, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 15/830,992

(22) Filed: Dec. 4, 2017

(65) Prior Publication Data

US 2018/0088571 A1  Mar. 29, 2018

(51) Int. Cl.
| | | |
|---|---|---|
| G05D 1/00 | (2006.01) | |
| G05D 1/02 | (2020.01) | |
| B60W 60/00 | (2020.01) | |

(52) U.S. Cl.
CPC .......... *G05D 1/0027* (2013.01); *B60W 60/00* (2020.02); *G05D 1/0088* (2013.01); *G05D 1/0276* (2013.01); *G05D 1/0287* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2015/0248131 A1* | 9/2015 | Fairfield | G05D 1/0044 701/2 |
| 2017/0192423 A1 | 7/2017 | Rust et al. | |
| 2018/0011488 A1* | 1/2018 | Nishi | G06N 3/006 |

OTHER PUBLICATIONS

Wisniowski, M. et al.; Vehicle Remote Assistance Mode and assigned U.S. Appl. No. 15/706,113, filed Sep. 15, 2017, 45 Pages.

* cited by examiner

*Primary Examiner* — Lail A Kleinman
(74) *Attorney, Agent, or Firm* — Lorenz & Kopf, LLP (57) ABSTRACT

Systems and method are provided for controlling a vehicle. In one embodiment, a vehicle includes: one or more onboard sensing devices, one or more onboard actuators, and a controller that, by a processor, obtains sensor data from the one or more sensing devices, identifies an assistance event based at least in part on the sensor data, determines an automated response to the assistance event based at least in part on the sensor data and an autonomous assistance policy, and autonomously operates the one or more actuators onboard the vehicle in accordance with the automated response. In exemplary embodiments, the autonomous assistance policy is determined using inverse reinforcement learning to optimize a reward function and mimic a remote human assistor.

20 Claims, 7 Drawing Sheets

AUTONOMOUS VEHICLE OPERATIONS WITH AUTOMATED ASSISTANCE

TECHNICAL FIELD

The present disclosure generally relates to automotive vehicles, and more particularly relates to systems and methods for autonomously controlling vehicles using policies determined using inverse reinforcement learning.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Due to the sheer number of different variables in a real-world environment, an autonomous vehicle control system could encounter an environment or scenario where assistance may be desired during the decision-making process. For example, road construction, road closures, and other obstacles or scenarios can be encountered that inhibit the ability of the control system to arrive at a solution for how to autonomously operate the vehicle in the context of lane boundaries or other restrictions or constraints for which compliance is sought. While a vehicle occupant could manually control or operate the vehicle in some instances, such a solution introduces a burden on a rider that is somewhat contrary to the intent of an autonomous vehicle. Utilizing remote assistance or remote control of the vehicle has also been proposed as a manner of resolving scenarios where the autonomous vehicle control system is unable to arrive at a satisfactory control solution. However, reliance on remote assistance also entails concerns about latencies or delays, communications reliability or interruptions, and the like. Accordingly, it is desirable to provide vehicle control systems and methods that are capable of autonomously resolving a scenario when the normal control scheme is unable to arrive at a satisfactory solution for how to autonomously operate the vehicle. Other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a vehicle includes one or more sensing devices onboard the vehicle, a data storage element to maintain an autonomous assistance policy, one or more actuators onboard the vehicle, and a controller that, by a processor, obtains sensor data from the one or more sensing devices, identifies an assistance event based at least in part on the sensor data, determines an automated response to the assistance event based at least in part on the sensor data and the autonomous assistance policy, and autonomously operates the one or more actuators onboard the vehicle in accordance with the automated response.

In another embodiment, a method of controlling a vehicle is provided. The method involves a control module of the vehicle obtaining sensor data from one or more sensing devices onboard the vehicle, identifying an assistance event based at least in part on the sensor data, obtaining an autonomous assistance policy from a remote device, determining an automated response to the assistance event based at least in part on the sensor data and the autonomous assistance policy, and autonomously operating one or more actuators onboard the vehicle in accordance with the automated response.

In another embodiment, an autonomous vehicle control system is provided. The autonomous vehicle control system includes a database to maintain vehicle state data associated with assistance requests provided by a plurality of vehicles and assistance response data corresponding to assistance responses to the assistance requests and a server coupled to the database. The server determines a reward function for modifying vehicle states based on relationships between the state data and the response data, determines a policy for autonomously modifying vehicle states based on the reward function, and provides the policy to at least one of the plurality of vehicles over a network, wherein one or more actuators onboard the at least one vehicle are autonomously operated in a manner that is influenced by the policy.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In one or more exemplary embodiments described herein, a vehicle capable of at least some level of autonomous operation includes a number of different devices that capture images or otherwise generate data representative of a scene or environment in a vicinity of the vehicle from different perspectives. The relationship of a particular device may be calibrated with respect to another device or reference frame, such as the vehicle reference frame or a coordinate frame of the device (or vice versa), resulting in a transformation function that may be utilized to translate from one reference frame to another to establish correlations between data sets. For example, image data from one onboard imaging device may be correlated or calibrated with ranging data from a ranging device onboard the vehicle to translate three-dimensional ranging data from the ranging device to a two-dimensional image captured by the imaging device, and vice versa. For purposes of explanation, the subject matter may be described herein primarily in the context of the imaging devices being realized as cameras and the ranging devices being realized as light detection and ranging (lidar) devices. That said, it should be appreciated that the subject matter described herein is not necessarily limited to use with optical cameras and lidars. Alternative embodiments may employ other types of cameras or imaging devices, radar or other types of ranging devices, or any number of combinations of imaging devices and ranging devices.

As described in greater detail below primarily in the context of FIGS. 5-7, in exemplary embodiments described herein, when the vehicle control system is unable to arrive at a solution for a path for autonomously operating the vehicle based on the captured data corresponding to the operating environment around the vehicle, an assistance request may be generated. An automated response to the assistance request is generated using that captured environmental data and an assistance policy determined using inverse reinforcement learning. In this regard, sets of previous remote assistance requests and corresponding environmental and vehicle state data from various vehicles are compared to manual remote assistance responses previously provided for those remote assistance requests to determine a reward function representative of the manual remote assistance behavior. The assistance policy for autonomously modifying the vehicle state is determined based on the optimized reward function, and is then utilized in response to a subsequent assistance request to augment the normal autonomous vehicle control scheme when it is unable to solve for a vehicle path compliant with lane boundaries or other constraints or restrictions. Accordingly, the automated assistance policy may be utilized by vehicles in lieu of reliance on manual responses to remote assistance requests.

In one or more exemplary embodiments, previous manual remote assistance responses (or human expert vehicle trajectories) are collected, aggregated, or otherwise stored in a database or similar data storage element in association with the corresponding remote assistance request data and analyzed "offline" to compute a reward function and automated autonomous assistance policy. Depending on the embodiment, the policy may be pushed or otherwise distributed to vehicles, or alternatively stored at a remote location that analyzes and responds to subsequent remote assistance requests. In this regard, the assistance policy is applied to the environmental and vehicle state data associated with a subsequent assistance requests to autonomously determine an action for transitioning the requesting vehicle from the current state to a second state based on the assistance policy and the instant environmental and vehicle state data.

It should be noted that as used herein, the action does not necessarily correspond directly to a particular state change or destination vehicle state. That is, the action may influence the probability distribution over potential state transitions, which, in turn influences the resulting state transition. For example, the action autonomously determined by application of the assistance policy may involve temporarily modifying one or more criteria or constraints used by the autonomous vehicle controls (e.g., expanding lane boundaries to include the entire paved surface area of the roadway), where the resulting state change or destination vehicle state is influenced by (but not necessarily entirely dictated by) the modified criteria.

Figure 1:
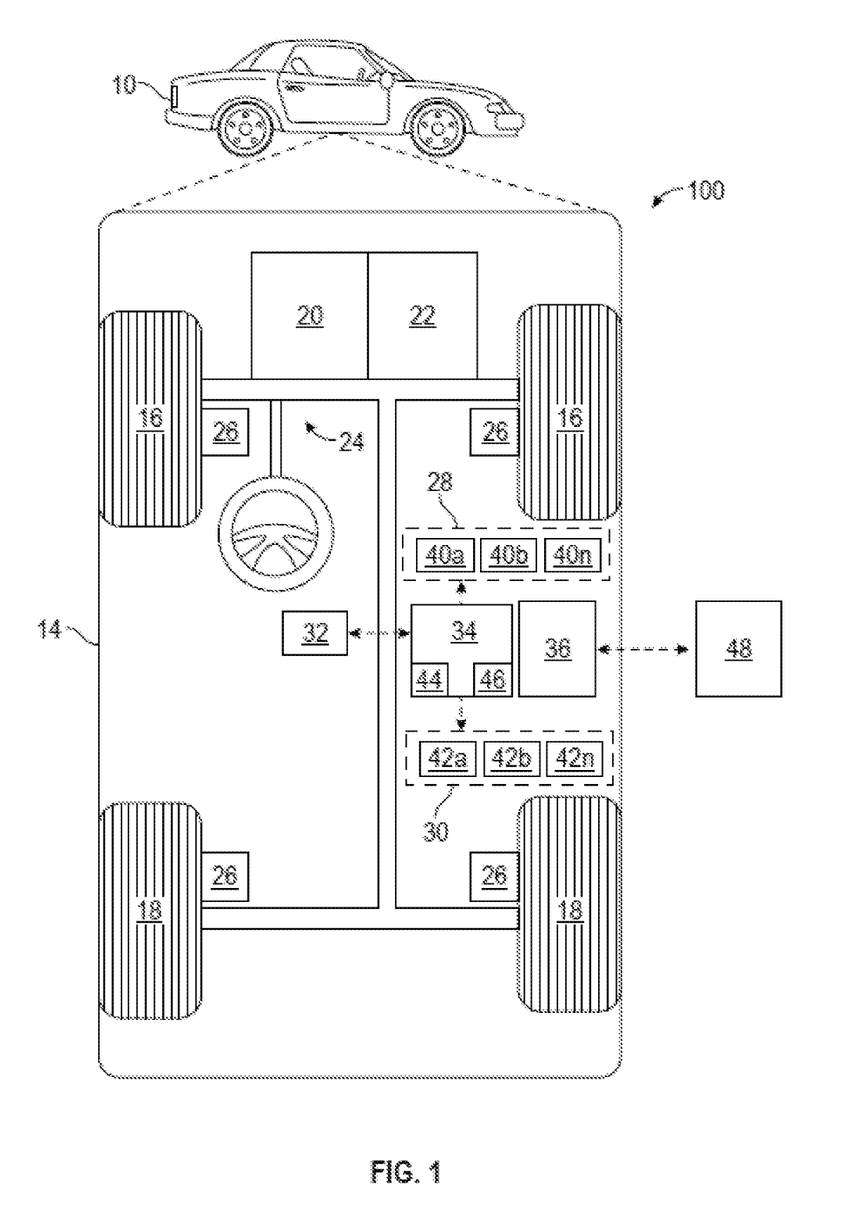
FIG. 1 is a functional block diagram illustrating an autonomous vehicle in accordance with various embodiments.

Referring now to FIG. 1, in accordance with one or more embodiments, an autonomous vehicle control system shown 100 determines a motion plan for autonomously operating a vehicle 10 along a route in a manner that accounts for objects or obstacles detected by onboard sensors 28, 40, as described in greater detail below. In this regard, a control module onboard the autonomous vehicle 10 calibrates different types of onboard sensors 28, 40 with respect to one another and/or the vehicle 10, thereby allowing data from those different types of onboard sensors 28, 40 to be spatially associated or otherwise with one another based on the calibration for purposes of object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below. In one or more exemplary embodiments, the data storage element 46 maintains an automated assistance policy that is utilized or otherwise referenced by the processor 44 to determine commands for autonomously operating the vehicle 10 in response to an assistance request that may be generated by the normal vehicle guidance or control scheme supported by the processor 44, for example, when the control scheme is unable to solve for a commanded vehicle path that complies with lane boundaries, or the like.

Figure 2:
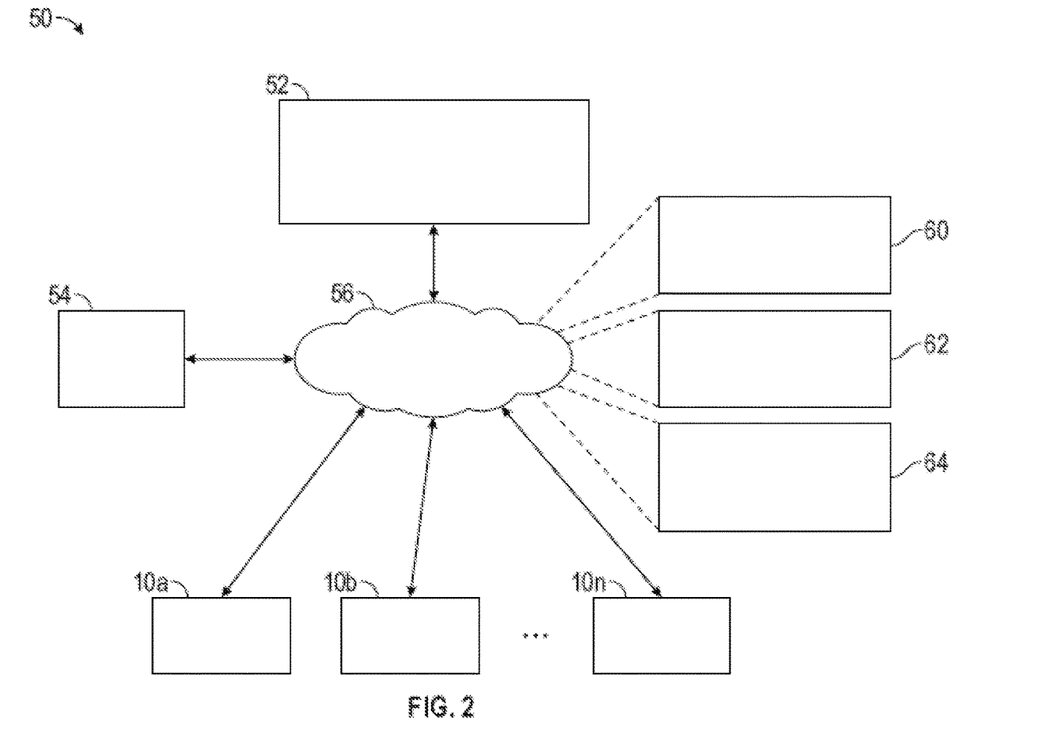
FIG. 2 is a functional block diagram illustrating a transportation system having one or more autonomous vehicles of FIG. 1, in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more instances of autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide unidirectional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
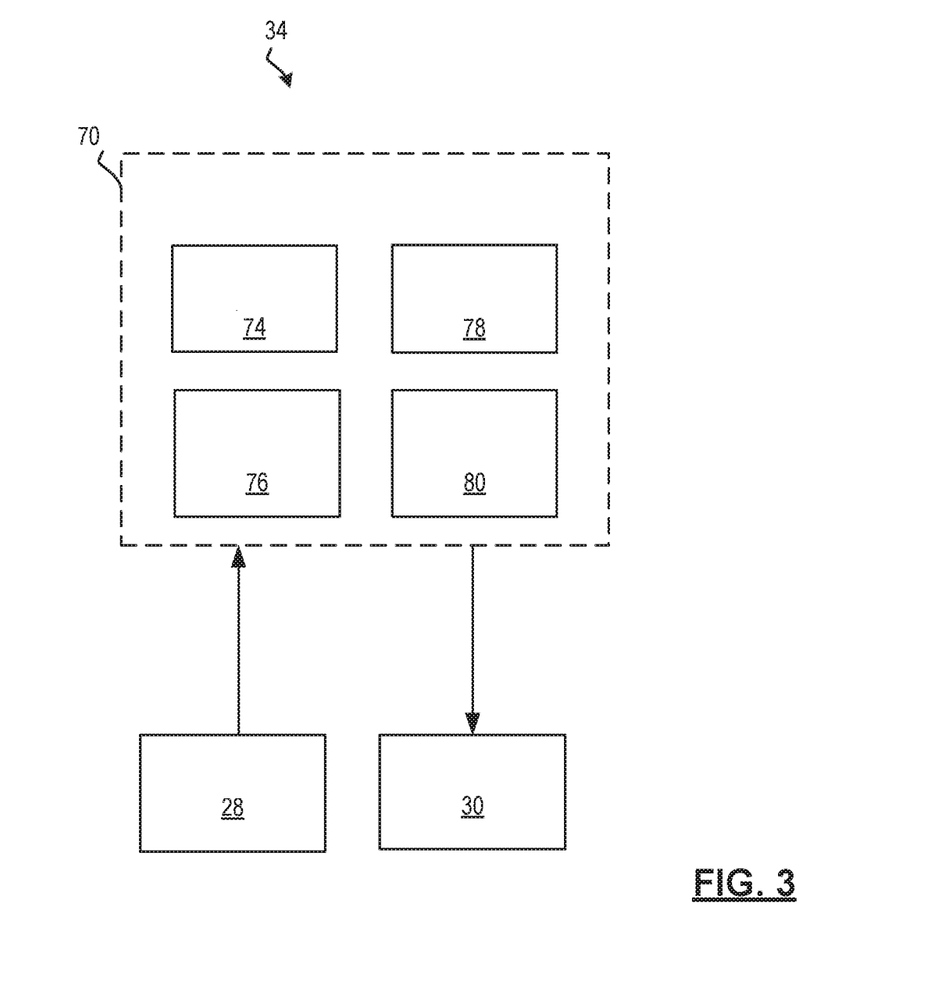
FIG. 3 is a schematic block diagram of an automated driving system (ADS) suitable for implementation by the vehicle of FIG. 1 in accordance with various embodiments.

Referring now to FIG. 3, in accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors. In one or more exemplary embodiments described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. In this regard, when the guidance system 78 is unable to determine a path for the vehicle 10 to follow given the current sensor data and vehicle pose, an automated assistance policy is invoked or otherwise utilized by the guidance system 78 to respond to an assistance event, as described in greater detail below. The vehicle control system 80 then generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
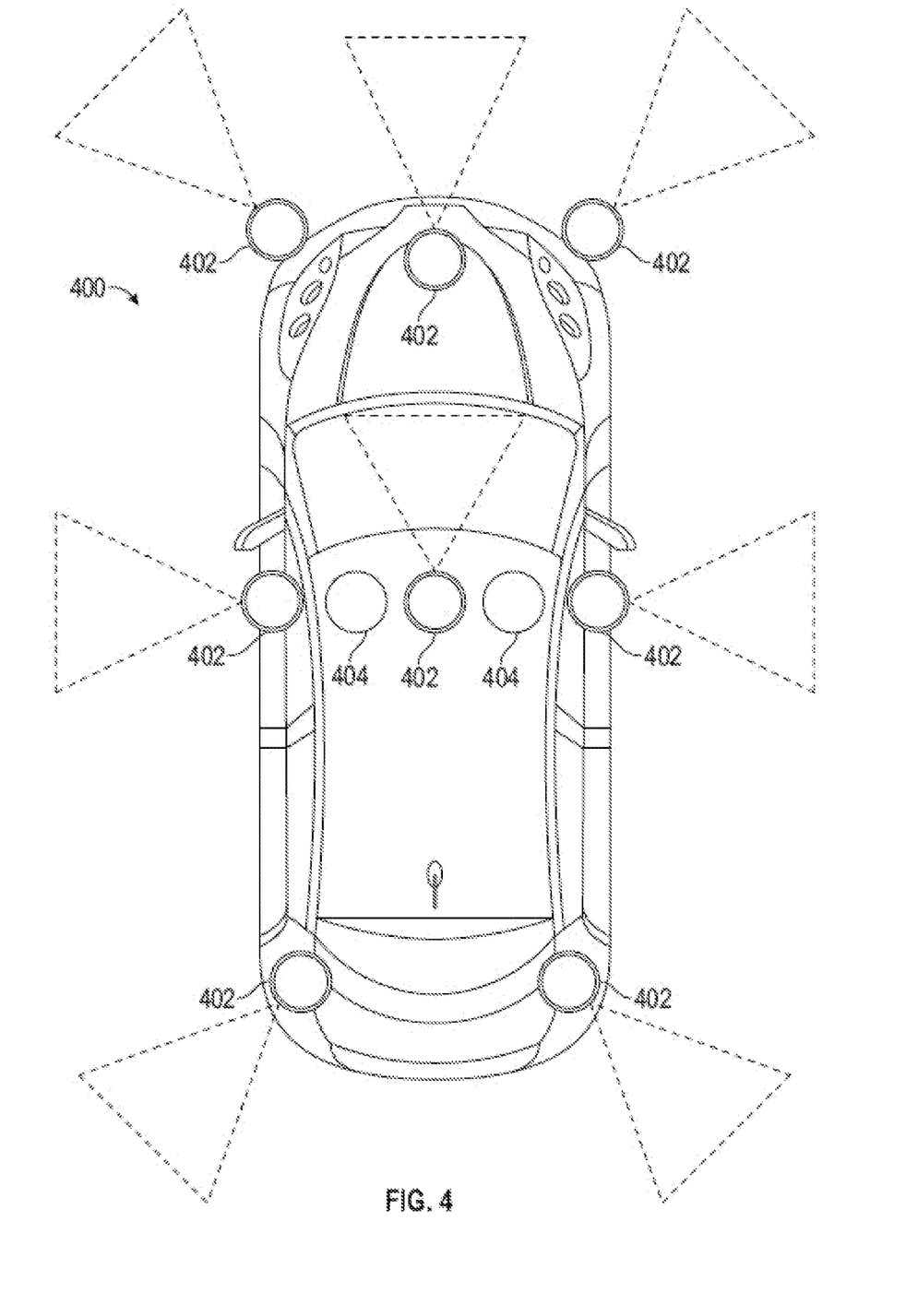
FIG. 4 is an illustration of an arrangement of a plurality of imaging devices and a plurality of ranging devices onboard a vehicle such as the autonomous vehicle of FIG. 1 in accordance with various embodiments.

FIG. 4 depicts an exemplary vehicle 400 that includes a plurality of cameras 402 distributed about the vehicle 400 and a plurality of ranging devices 404 distributed about the vehicle 400. The cameras 402 are disposed at different locations and oriented to provide different field of views that capture different portions of the surrounding environment in the vicinity of the vehicle 400. For example, a first camera is positioned at the front left (or driver) side of the vehicle 400 and has its field of view oriented 45° counterclockwise relative to the longitudinal axis of the vehicle 400 in the forward direction, and another camera may be positioned at the front right (or passenger) side of the vehicle 400 and has its field of view oriented 45° clockwise relative to the longitudinal axis of the vehicle 400. Additional cameras are positioned at the rear left and right sides of the vehicle 400 and similarly oriented away from the longitudinal axis at 45° relative to the vehicle longitudinal axis, along with cameras positioned on the left and right sides of the vehicle 400 and oriented away from the longitudinal axis perpendicular to the vehicle longitudinal axis. The illustrated embodiment also includes a pair of cameras positioned at or near the vehicle longitudinal axis and oriented to capture a forward looking field of view along a line of sight substantially parallel to the vehicle longitudinal axis.

In exemplary embodiments, one or more of the cameras 402 have angle of views, focal lengths, and other attributes that may be different from those of one or more other cameras 402. For example, the cameras on the right and left sides of the vehicle may have an angle of view that is greater than the angle of view associated with the cameras positioned at the front left, front right, rear left, or rear right of the vehicle. In some embodiments, the angle of view of the cameras are chosen so that the field of view of different cameras overlap, at least in part, to ensure camera coverage at particular locations or orientations relative to the vehicle 400.

One of more ranging devices 404 are also disposed at different locations of the vehicle 400 to achieve parallax, and in one embodiment, are disposed symmetrically about the longitudinal axis of the vehicle 400. In exemplary embodiments described herein, the ranging devices 404 are realized as lidar devices. In this regard, each of the ranging devices 404 may include or incorporate one or more lasers, scanning components, optical arrangements, photodetectors, and other components suitably configured to horizontally and rotatably scan the environment in the vicinity of the vehicle 400 with a particular angular frequency or rotational velocity. For example, in one embodiment, each lidar device 404 is configured to horizontally rotate and scan 360° at a frequency of 10 Hertz (Hz). As used herein, a lidar scan should be understood as referring to a single revolution of a lidar device 404.

In exemplary embodiments described herein, the cameras 402 autonomously and automatically captures images at a particular frequency, which may be greater than the angular frequency of the lidar devices 404. In one embodiment, the frequency or sampling rate of the cameras 402 is at least twice the angular frequency of the lidar device 404. For example, the cameras 402 may capture new image data corresponding to their respective field of view at a rate of 30 Hz while the lidar device 404 scans and automatically provides updated data at a rate of 10 Hz. Thus, each camera 402 may capture multiple images per lidar scan, and capture the images at different times independent of the orientation of the lidar device 404 or the angular position within the scan. In such embodiments, an image from each respective camera 402 that is temporally associated with the lidar point cloud data from a particular lidar scan may be selected or identified based on the relative time difference between when the image is obtained and when the angular position of the lidar scan corresponds to the line of sight of a lidar device 404 being aligned with the line of sight or the angle of view of the respective camera 402.

In other embodiments, images obtained during a lidar scan may be fused or otherwise combined to achieve a representative image corresponding to the lidar scan. In yet other embodiments, the cameras 402 may be triggered or otherwise controlled to capture images at the instance in time during a lidar scan when the angular position of the lidar scan corresponds to the line of sight of a lidar device 404 being aligned with the line of sight or the angle of view of the respective camera 402. In this regard, it should be understood there are numerous different ways to synchronize or temporally associate different data sets, and the subject matter described herein is not intended to be limited to any particular manner for identifying or associating image data of a region with a lidar scan of that region or corresponding lidar data representative of that region.

Figure 5:
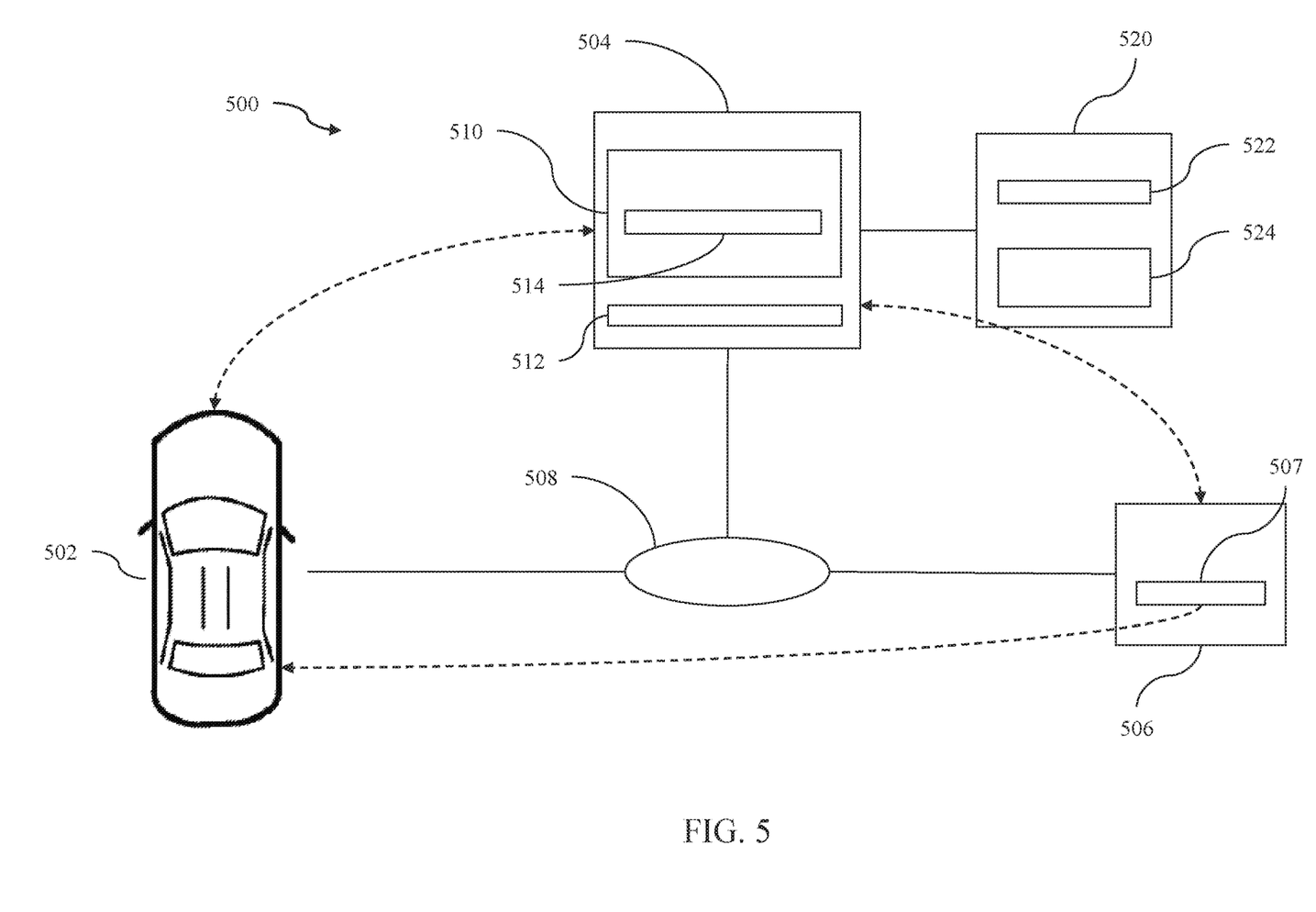
FIG. 5 is a block diagram of a remote assistance system in accordance with one or more exemplary embodiments.

FIG. 5 depicts an exemplary embodiment of a remote assistance system 500 suitable for remotely assisting one or more autonomous vehicles 502 (e.g., vehicle 10, 400) communicatively coupled to a communications network 508. The remote assistance system 500 includes a remote server 504 coupled to the network 508 and one or more remote computing devices 506 coupled to the network 508 that may be utilized by a human user to manually provide remote assistance responses to remote assistance requests generated by a vehicle 502. It should be noted that practical embodiments of the remote assistance system 500 could include any number of vehicles 502 and remote devices 504, 506. Additionally, while FIG. 5 depicts a single communications network 508 for purposes of illustration and ease of description, practical embodiments of the remote assistance system 500 may utilize multiple different communications networks, which may be logically or physically distinct or separate from one another. For example, vehicles 502 could communicate with a remote server 504 over a different communications network than what is used for communications between the remote server 504 and remote computing devices 506, and similarly, the vehicles 502 could communicate with the remote computing devices 506 over a different communications network than what is used for communications with the remote server 504.

In general, the remote assistance system 500 enables remote assistance to augment the intelligence of the onboard computer of an autonomous vehicle 502, for example, when the onboard computer of the autonomous vehicle 502 is unable to determine a satisfactory solution given a current vehicle and environmental state and may wish to request assistance in analyzing data or deciding for successfully negotiating the particular scenario. Rather than reliance on a human driver riding in the autonomous vehicle 502, the remote assistance system 500 enables the onboard computer to request assistance from a human expert via a remote assistance application 507 on a remote computing device 506.

Some example scenarios in which remote assistance may be desired include scenarios in which autonomous vehicle sensing is impaired (e.g., due to a sensor anomaly, environmental hazards, or other causes), scenarios in which autonomous vehicle operation is impaired (e.g., a flat tire, mechanical problems, etc.), scenarios in which autonomous vehicle decision-making confidence is low (e.g., unrecognized objects in the road, a vehicle or pedestrian behaving erratically, objects blocking a path of the autonomous vehicle), and scenarios in which interaction is otherwise desired with environment or other entities (e.g., inclement weather, a passenger or pedestrian is in need of medical assistance, a vehicle is occupied by an unauthenticated individual, an item has been left in a vehicle by a previous occupant). Remote assistance may also be requested by an occupant of the autonomous vehicle.

As another common example, an autonomous vehicle may encounter an assistance-desired scenario in which the only possible routing or path for traversing the assistance-desired scenario involves violating one or more traffic laws or violating vehicle travelling norms and general rerouting (e.g., in compliance with traffic laws) of the autonomous vehicle is not an available option. These type of assistance-desired scenarios may require that the autonomous vehicle traverse across a double yellow line and into opposing traffic possibly to avoid an accident or a double-parked vehicle or the like. However, in some embodiments, the standard control and/or operational parameters for the autonomous vehicle do not allow for the autonomous vehicle to expressly violate traffic laws or lane boundaries, and further, the autonomous vehicle may not have internal protocols sufficient to navigate across a double yellow line. In such embodiments, the onboard computer may generate an assistance request.

In response to an assistance-desired scenario, a human expert at a remote computing device 506 may take control of the autonomous vehicle 502 (e.g., via network 508) in order to traverse the double yellow lines remotely. Alternatively, the remote assistance application 507 may be utilized to draw, generate and/or select a proposed route for traversing the assistance-desired scenario and transmitting the proposed route to the autonomous vehicle 502 for implementation and/or execution. For instance, the remote assistance application 507 may allow a human-expert to temporarily re-draw existing boundary lines, such as traffic lines that define a road or travel lane, via a user interface supported by the computing device 506. In such example, a human expert may use an input tool, such as a drawing pen or their finger, to draw new boundary lines or a new travel lane onto a display showing an actual view of the circumstances around the autonomous vehicle 502. The re-drawn boundary lines once completed or at a time at which the new boundary lines are being drawn by the human expert may be transmitted to the autonomous vehicle. Essentially, the human expert is able to draw new lanes for navigating an avoidance scenario, and at the same time or contemporaneous with the drawing by the human expert, the new travel lanes will be provided to the autonomous vehicle. Additionally or alternatively, by drawing the new route by the human expert, the remote computing device 506 may automatically generate autonomous vehicle control data that will be transmitted over the network 508 to the autonomous vehicle 502 along with or separate from the drawing. The autonomous vehicle control data will preferably include computer instructions, that when executed by the onboard computer of the autonomous vehicle 502, enables the autonomous vehicle 502 to travel in accordance with the redrawn boundary lines.

Another assistance-desired scenario may include when the roads are repainted and/or construction in which the autonomous vehicle must drive the wrong direction or path and in another lane, as described similarly above. These types of scenarios may give rise to circumstances in which a two-way road becomes a bi-directional one way shared road that may include traffic signal controllers (e.g., human traffic guidance) and the like.

As described above, the computer onboard the vehicle 502 functions to autonomously control the vehicle. The onboard computer is preferably coupled to a sensor suite (e.g., computer vision system, LIDAR, wheel speed sensors, GPS, etc.) and processes sensed data from the sensor suite and/or other sensors in order to determine the state of the autonomous vehicle; and, based upon the vehicle state and programmed instructions or rules for how the vehicle should be operated, the onboard computer preferably modifies or controls behavior of the autonomous vehicle 502.

In one or more exemplary embodiments, the onboard computer generates or otherwise provides assistance requests to the remote server 504, which include state data representative of the current state of the vehicle 502 and the surrounding environment. Such state data accompanying an assistance request may include raw sensor data (e.g., the view of one or more cameras of the autonomous vehicle), processed sensor data (e.g., a camera view overlaid with object identification indicators placed by the autonomous vehicle's on-board computer, predicted vehicle trajectory), autonomous vehicle analysis (e.g., a text description, generated by the autonomous vehicle, of a scene imaged by a machine vision system), historical behavior of the autonomous vehicle, planned future (or proposed) behavior of the autonomous vehicle, current vehicle pose, communication data from another entity (e.g., occupants of the vehicle, pedestrians, authorities, an internal or external entity that has accessed the vehicle, users of a driverless vehicle service etc.), or any other data characterizing the state of the vehicle or the operating environment surrounding the vehicle or otherwise in proximity to the vehicle.

The remote computing device 506 generally represents an electronic device coupled to the network 508 that may be utilized by a user to provide remote assistance responses. The remote computing device 506 can be realized as any sort of personal computer, mobile telephone, tablet or other network-enabled electronic device. The remote computing device 506 generally includes a display device, such as a monitor, screen, or another conventional electronic display, capable of graphically presenting data and/or information corresponding to an assistance request provided by the remote server 504 along with a user input device, such as a touchscreen, a touch panel, a mouse, a joystick, a directional pad, a motion sensor, or the like, capable of receiving input from the user of the remote computing device 506. The illustrated remote computing device 506 executes or otherwise supports a remote assistance application 507 that communicates with the remote server 504 to receive assistance request data, generate corresponding graphical representations pertaining a particular assistance request, receive a response to the assistance request from the user, and then transmit the corresponding remote assistance response to the autonomous vehicle 502 associated with the particular assistance request.

In one or more embodiments, the remote assistance system 500 routes assistance requests or assistance to autonomous vehicles using the remote server 504. For example, the remote server 504 may select a particular remote computing device 506 or a particular human expert from a list of available remote computing devices 506 or experts, and dispatch or otherwise assign assistance requests to the selected assistor. Alternatively, the remote server 504 may maintain a queue of remote assistance requests from which a remote assistance request to be serviced may be selected by a particular remote computing device 506 or expert. The remote server 504 may also perform various prioritization algorithms, grouping algorithms, or other operations on assistance requests to facilitate handling of assistance requests in a desired manner.

The remote server 504 generally represents a computing device, computing system or another combination of processing logic, circuitry, hardware, and/or other components configured to support the assistance policy determination processes, tasks, operations, and/or functions described herein. In this regard, the server 504 includes a processing system 510, which may be implemented using any suitable processing system and/or device, such as, for example, one or more processors, central processing units (CPUs), controllers, microprocessors, microcontrollers, processing cores and/or other hardware computing resources configured to support the operation of the processing system 510 described herein. The processing system 510 may include or otherwise access a data storage element 512 (or memory) capable of storing programming instructions for execution by the processing system 510, that, when read and executed, cause processing system 510 to support the processes described herein. Depending on the embodiment, the memory 512 may be realized as a random access memory (RAM), read only memory (ROM), flash memory, magnetic or optical mass storage, or any other suitable non-transitory short or long term data storage or other computer-readable media, and/or any suitable combination thereof.

In one or more embodiments, the programming instructions cause the processing system 510 to create, generate, or otherwise facilitate an inverse reinforcement learning application 514 that supports determining an autonomous assistance policy based on the relationships between assistance request data 522 and corresponding assistance response data 524, as described in greater detail below. In this regard, in exemplary embodiments, the remote server 504 is coupled to a database 520 that stores or otherwise maintains assistance request data 522 and corresponding assistance response data 524 in association with one another for analysis by the inverse reinforcement learning application 514.

As described in greater detail below in the context of FIG. 6, in exemplary embodiments, the assistance request data 522 includes, for an assistance request received by the server 504 from a vehicle 502, state data or information characterizing the operating environment associated with the assistance request, such as, for example, raw sensor data, processed sensor data, autonomous vehicle analysis data, historical behavior and/or planned future (or proposed) behavior of the autonomous vehicle, current vehicle pose, and the like. Thus, the assistance request data 522 characterizes the state of the vehicle and/or the operating environment that triggered the assistance request. Additionally, in one or more exemplary embodiments, the assistance request data 522 also includes state data or information for the duration of time corresponding to an assistance response to the assistance request. Thus, the assistance request data 522 may also characterize the state of the vehicle and/or the operating environment during the period of time while the requesting vehicle 502 is receiving assistance.

In exemplary embodiments, the assistance response data 524 includes, for each instance of assistance request data 522, data or information characterizing the response to that particular assistance request provided by the remote computing device 506 to the requesting vehicle 502. In this regard, the assistance response data 524 characterizes and documents the remedial commands or actions provided to the requesting vehicle 502 to resolve the need for assistance.

For example, in some instances, the assistance response data 524 may include the commands or actions by a human expert at the remote computing device 506 to remotely control the vehicle 502. In other instances, the assistance response data 524 may characterize a proposed route for traversing the assistance-desired scenario that was drawn, generated, or otherwise selected by a user of the remote assistance application 507. In yet other instances, the assistance response data 524 may characterize the manner in which existing boundary lines or other constraints were modified for navigating the scenario that triggered the assistance request.

Figure 6:
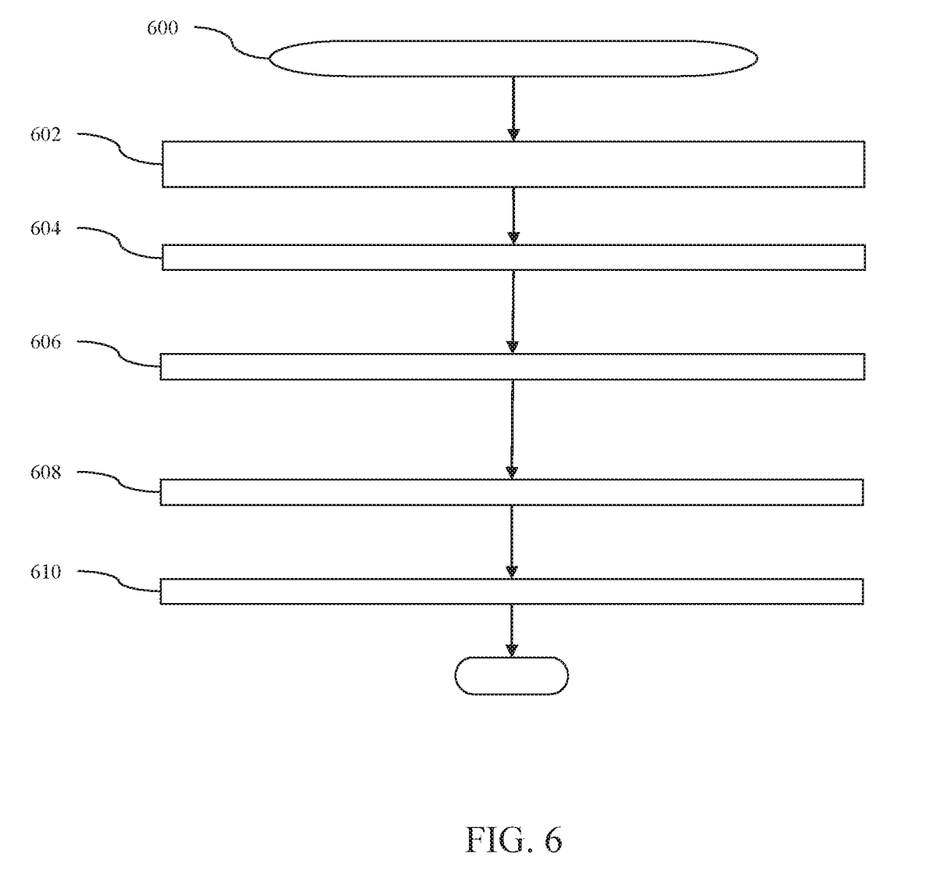
FIG. 6 is a flowchart illustrating an assistance policy determination process in accordance with one or more exemplary embodiments.

FIG. 6 depicts a flow diagram illustrating an exemplary embodiment of an assistance policy determination process 600 that may be supported by an autonomous vehicle system. The order of operation within the method is not limited to execution sequentially as depicted in FIG. 6, but may be performed in one or more varying orders as applicable and in accordance with the present disclosure. Moreover, one or more of the tasks shown and described in the context of FIG. 6 could be omitted from a practical embodiment of the assistance policy determination process 600 while still achieving the generally intended overall functionality. For illustrative purposes, the following description may refer to elements mentioned above in connection with FIGS. 1-5. In this regard, while portions of the assistance policy determination process 600 may be performed by different elements of an autonomous vehicle control system, for purposes of explanation, the subject matter may be primarily described herein in the context of the assistance policy determination process 600 being primarily performed or supported by the remote server 504.

The illustrated assistance policy determination process 600 initializes or otherwise begins by capturing or otherwise obtaining state data corresponding to remote assistance requests from a plurality of autonomous vehicles at 602 and the remote assistance response data associated with the respective remote assistance requests that was provided to the respective autonomous vehicles at 604. In this regard, in response to an autonomous vehicle 10, 502 encountering an event or scenario where the autonomous control system is unable to resolve a solution that complies with lane boundaries or other constraints or restrictions, a control module of the vehicle 10, 502, such as controller 34 or processor 44, captures environmental and other operational state data utilizing the onboard sensing elements 28, 40, 402, 404 and transmits or otherwise provides an assistance request along with the corresponding state data. In one or more exemplary embodiments, the assistance request is provided to a remote server 504 which routes or otherwise distributes the assistance request to a particular remote assistor 506, 507 and stores or otherwise maintains the associated assistance request state data 522 in the database 520.

As described above, a human user at the remote computing device 506 may utilize the remote assistance application 507 to analyze the state data associated with the assistance request and provide a remote assistance response that is transmitted back to the requesting vehicle 502. Depending on the embodiment, one of the assisting device 506 or the requesting vehicle 502 uploads, transmits, or otherwise provides the corresponding remote assistance response data to the remote server 504, which stores or otherwise maintains the assistance response data 524 in the database 520 in association with its assistance request state data 522. In this regard, for each instance of assistance request state data 522 in the database 520, of remote assistance response data 524 corresponding to the human response to that remote assistance request is paired or otherwise associated with that instance of assistance request state data 522. The paired data sets may thereby reflect multiple different remote assistance events or scenarios, encountered by multiple different vehicles 502, with corresponding responses from multiple different remote assistors. In exemplary embodiments, the remote server 504 receives or otherwise obtains assistance request state data and remote assistance response data corresponding to the entire duration over which remote assistance is provided.

The assistance policy determination process 600 continues by applying inverse reinforcement learning to the paired sets of assistance request and assistance response data to optimize a reward function relating the assistance responses to the assistance request state data at 606 and then determining a policy for autonomously modifying the vehicle state based on the reward function at 608. In an exemplary embodiment, the inverse reinforcement learning application 514 utilizes a Markov decision process to optimize an unknown reward function for how the vehicle state should be augmented or modified to resolve a remote assistance event based on the relationship between the remote assistance request state data 522 and the remote assistance response data 524 for responding to the respective remote assistance requests. In this regard, the remote assistance request state data 522 provides the set of vehicle states and the remote assistance response data 524 provides the set of actions for transitioning between vehicle states, with the relationship between actions and state transitions being indicative of the reward function. Once the weighting factors of the reward function for transitioning between vehicle states is optimized, the inverse reinforcement learning application 514 determines a policy for autonomously modifying the vehicle state based on the reward function. In this regard, the policy is configured to generate or otherwise produce an action when applied to an input vehicle state that best reflects the optimized reward function. Thus, the resulting policy dictates how the autonomous vehicle control scheme or its constraints should be augmented or modified to achieve an automated solution to an assistance event that influences vehicle state in a manner that best reflects the optimized reward function.

For example, the assistance request state data may include the physical position and speed of obstacles, the physical position and speed of the vehicle, the current direction of the vehicle's steering, and the current lane boundaries, and the set of potential assistance response actions available to a human expert may include doing nothing, expanding the lane boundaries to include the entirety of the paved surface of the road, steering 10 degrees left, steering 10 degrees right, moving forward one meter, or moving backward one meter. After collecting multiple instances of remote assistance responses including one or more of the potential assistance response actions, inverse reinforcement learning can be applied to the relationships between the remote assistance responses and their associated assistance request state data to determine a reward function that provides a mapping between vehicle states and numerical reward value representations. For example, destination vehicle states that increase the probability of an adverse event may have a relatively punitive negative value, while a positive value may be assigned to states in which the vehicle can successfully maneuver therefrom autonomously (e.g., after restoration of the lane boundaries or other criteria which may have been modified by the assistance response).

Once the reward function is determined, an autonomous assistance policy can be determined to map vehicle states to actions. In effect, the autonomous assistance policy may provide one or more logic rules or criteria for arbitrating among potential response actions depending on the current environmental and vehicle state data. For example, an example policy may indicate that when a vehicle is stopped or stuck behind an obstacle and the lane boundaries have not been expanded, the response action should be to expand the lane boundaries. If the vehicle is stopped or stuck behind an obstacle and the boundaries have already been expanded, then the assistance policy may indicate the response action should be move the vehicle backwards by one meter. If the vehicle is moving, the policy may indicate that no response action is required (e.g., do nothing), and for other states, the policy may indicate a response action should be randomly selected from among steering 10 degrees left, steering 10 degrees right, and moving forward one meter. It should be noted that this is merely one simplified example of an autonomous assistance policy for purposes of explanation, and is not intended to be limiting.

Still referring to FIG. 6, the illustrated assistance policy determination process 600 continues by transmitting or otherwise providing the autonomous assistance response policy to vehicles for subsequent implementation at 610. In one or more embodiments, the remote server 504 automatically pushes the autonomous assistance response policy to autonomous vehicles 502 over the network 508. In other embodiments, the remote server 504 automatically provides the autonomous assistance response policy to individual autonomous vehicles 502 in response to receiving a remote assistance request after the autonomous assistance response policy has been determined. In such embodiments, the remote assistance request may be discarded, or further handling of the remote assistance request may be deferred until confirming that the autonomous assistance response policy is unable to resolve the assistance event. In yet other embodiments, the remote server 504 provides the autonomous assistance response policy to autonomous vehicles 502 in response to a request for the autonomous assistance response policy.

In alternative embodiments, the autonomous assistance response policy may be implemented at the remote server 504 or other remote computing device 506 rather than at the vehicles 502. For example, in response to receiving an assistance request, the remote server 504 may apply the autonomous assistance response policy to the received state data associated with the assistance request to determine an action for modifying the vehicle state in accordance with the autonomous assistance response policy and provide corresponding commands or instructions back to the requesting vehicle 502 over the network 508 in response to the assistance request. In yet other embodiments, the remote server 504 may apply the autonomous assistance response policy to the received assistance request state data to determine an action and provide indicia of the recommended action for modifying the vehicle state to a remote computing device 506 for review or confirmation by a human user prior to instructing or commanding the vehicle for the recommended action. In this regard, a human user may modify or decline to initiate an action determined using the autonomous assistance response policy. In yet other embodiments, the remote server 504 pushes or provides autonomous assistance response policy to the various remote computing devices 506, which in turn, apply the autonomous assistance response policy to the received assistance request state data to determine a recommended action presented at the remote computing device 506 for review or confirmation by a human user prior to the remote computing device 506 instructing or commanding the vehicle for the recommended action.

It should be noted that the assistance policy determination process 600 may be repeated to dynamically update the autonomous assistance response policy throughout operation of an autonomous vehicle system. For example, as human users modify or decline actions recommended by the autonomous assistance response policy, the resulting assistance response data and paired assistance request data may be utilized to dynamically update the reward function, and thereby the autonomous assistance response policy to better reflect the behavior of human users responding to remote assistance requests.

Figure 7:
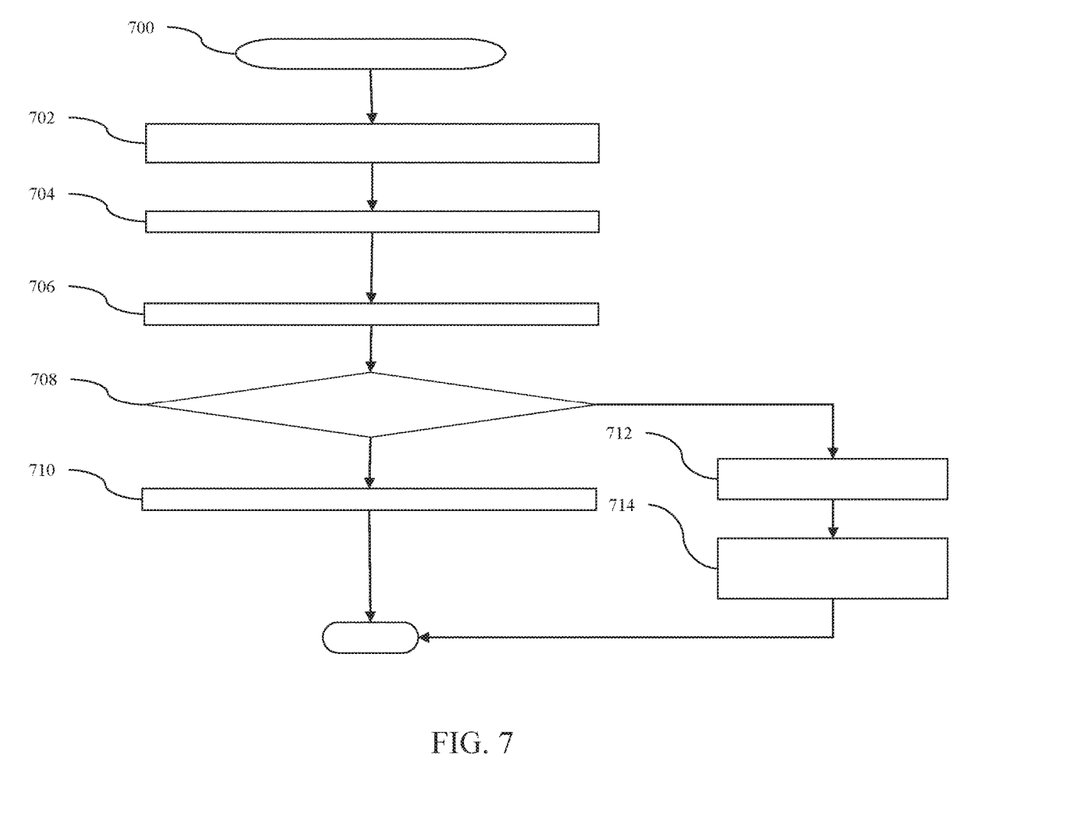
FIG. 7 is a flowchart illustrating a self-assistance process in accordance with one or more exemplary embodiments.

FIG. 7 depicts a flow diagram illustrating an exemplary embodiment of a self-assistance process 700 that may be performed by an autonomous vehicle 10, 502 to autonomously resolve an assistance event or scenario when the normal autonomous vehicle control scheme is unable to achieve a solution. The order of operation within the method is not limited to execution sequentially as depicted in FIG. 7, but may be performed in one or more varying orders as applicable and in accordance with the present disclosure. Moreover, one or more of the tasks shown and described in the context of FIG. 7 could be omitted from a practical embodiment of the self-assistance process 700 while still achieving the generally intended overall functionality. For illustrative purposes, the following description may refer to elements mentioned above in connection with FIGS. 1-5. In this regard, while portions of the self-assistance process 700 may be performed by different elements of an autonomous vehicle control system, for purposes of explanation, the subject matter may be primarily described herein in the context of the self-assistance process 700 being primarily performed or supported by a control module 34, 44 of an autonomous vehicle 10, 502.

In exemplary embodiments, the self-assistance process 700 is initiated or otherwise performed by an autonomous vehicle 10, 502 in response to encountering an event or scenario where the normal autonomous vehicle control scheme is unable to identify a solution that complies with lane boundaries and other constraints or restrictions (e.g., an assistance-desired scenario). The self-assistance process 700 obtains an autonomous assistance response policy at 702, obtains current vehicle and environmental state data at 704, and applies the autonomous assistance response policy to the current state data at 706 to determine an action for modifying or influencing the vehicle state. In this regard, the control module 34, 44 of the autonomous vehicle 10, 502 obtains current state data from onboard sensing elements 28, 40, 402, 404 and then utilizes the autonomous assistance response policy provided by or obtained from the remote server 504 to determine what actions should be taken by the control module 34, 44 of the autonomous vehicle 10, 502 to modify the vehicle state in a manner that mimics the behavior of a human remote assistor when the control module 34, 44 is unable to achieve a satisfactory solution for autonomously operating the vehicle 10, 502 based on the current state data.

At 708, the illustrated self-assistance process 700 determines whether or not the proposed action for modifying the vehicle state based on the autonomous assistance response policy is satisfactory or acceptable (e.g., a sanity check), and if so, the self-assistance process 700 autonomously operates the vehicle to perform the proposed action and autonomously resolve the assistance event at 710. In this regard, the control module 34, 44 may analyze one or more metrics associated with the recommended action to verify the probability of a human user initiating that action is sufficiently high, and/or the control module 34, 44 may apply one or more logic rules to the recommended action to verify the proposed action is allowable without human oversight. When the proposed action resulting from applying the autonomous assistance response policy to the current vehicle state data is acceptable, the control module 34, 44 implements corresponding actuator commands to achieve the desired action for modifying the vehicle state to autonomously resolve the assistance event. In one or more embodiments, the self-assistance process 700 repeats until the assistance event no longer exists, that is, the control module 34, 44 may temporarily modifies constraints of the normal control scheme or otherwise operate the onboard actuators 30, 42 in accordance with the autonomous assistance response policy until determining that the normal control scheme is able to solve for a path for autonomously operating the vehicle that satisfies lane boundaries and other applicable constraints or restrictions.

Conversely, when the proposed action resulting from applying the autonomous assistance response policy to the current vehicle state data is unacceptable, the self-assistance process 700 transmits or otherwise provides an assistance request for a remote assistor at 712. In this regard, when the recommended action seems unlikely to be one chosen by a human user or otherwise requires human oversight, the control module 34, 44 generates or otherwise provides a remote assistance request to a remote server 504 or other remote computing device 506 for resolution by a human user, as described above in the context of FIG. 5. In some embodiments, the assistance request may be accompanied by indicia of the recommended action or other analysis results from the control module 34, 44 applying the autonomous assistance response policy, which, in turn may be presented on a remote computing device 506 for review and/or acceptance by a human user. The self-assistance process 700 proceeds by operating the vehicle in accordance with the received assistance response from a remote assistor at 714. In this regard, the control module 34, 44 temporarily modifies constraints of the normal control scheme or otherwise operates the onboard actuators 30, 42 in accordance with commands or instructions received from a remote computing device 506 to resolve an assistance event in a similar manner as described above in the context of FIG. 5.

By virtue of the autonomous assistance response policy, an autonomous vehicle may autonomously and expeditiously respond to situations where the normal control scheme is unable to solve for a satisfactory solution without requiring manual intervention or other human oversight. Thus, delays and travel time associated with utilizing autonomous vehicles may be reduced, thereby improving user experience. Additionally, the amount or frequency at which remote assistance is necessary may be reduced across a fleet of vehicles, which in turn, may reduce overhead while also improving scheduling, time reliability, logistics, and the like.

For example, a control module of an autonomous vehicle may obtain sensor data from one or more sensing elements onboard the vehicle and identify an assistance event based at least in part on the sensor data (e.g., a sensor anomaly, an environmental hazard, a mechanical impairment, an inability to solve for a vehicle path that satisfies one or more constraints associated with operating the vehicle given the current sensor data, or the like). Rather than relying on a remote assistor and attendant delays and overhead, the control module may utilize the autonomous assistance policy to automatically determine a response to the assistance event based at least in part on the sensor data and autonomously operate one or more onboard actuators to transition the vehicle state in accordance with the autonomous assistance policy. Thus, autonomous operation to mitigate an assistance event can emulate remote assistance by a human without necessarily requiring any manual intervention, oversight, or associated delays.

For the sake of brevity, conventional techniques related to signal processing, data transmission, signaling, control systems, remote controls, Markov decision process, inverse reinforcement learning, machine learning, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   one or more sensing devices onboard the vehicle;
   one or more actuators onboard the vehicle; and
   a controller that, by a processor, obtains sensor data from the one or more sensing devices, identifies an assistance event based at least in part on the sensor data when a control scheme for autonomously operating the vehicle is unable to arrive at a solution for a path that satisfies one or more constraints associated with operating the vehicle, determines an automated response to the assistance event based at least in part on the sensor data and an autonomous assistance policy, and autonomously operates the one or more actuators onboard the vehicle in accordance with the automated response, wherein:

the autonomous assistance policy is determined based on sets of previous remote assistance requests and manual remote assistance responses previously provided for those previous remote assistance requests; and the controller determines the automated response by determining a current state of the vehicle based at least in part on the sensor data and determining an action for transitioning the vehicle from the current state to a second state by modifying at least one of the one or more constraints based on the autonomous assistance policy.

2. The vehicle of claim 1, wherein the assistance event comprises one of a sensor anomaly, an environmental hazard, or a mechanical impairment.

3. The vehicle of claim 1, further comprising a communication system coupled to a network to obtain the autonomous assistance policy from a remote device over the network.

4. The vehicle of claim 3, wherein the autonomous assistance policy is determined by the remote device using inverse reinforcement learning to determine a reward function for modifying vehicle states based on relationships between remote assistance request state data corresponding to the previous remote assistance requests and remote assistance response data corresponding to the manual remote assistance responses.

5. A method of controlling a vehicle, the method comprising:
obtaining, by a control module of the vehicle, sensor data from one or more sensing devices onboard the vehicle;
identifying, by the control module, an assistance event based at least in part on the sensor data when a control scheme for autonomously operating the vehicle is unable to arrive at a solution for a path that satisfies one or more constraints associated with operating the vehicle;
obtaining, by the control module, an autonomous assistance policy from a remote device, wherein the autonomous assistance policy is determined based on sets of previous remote assistance requests and manual remote assistance responses previously provided for those previous remote assistance requests;
determining, by the control module, an automated response to the assistance event based at least in part on the sensor data and the autonomous assistance policy, wherein determining the automated response comprises:
determining a current state of the vehicle based at least in part on the sensor data; and
determining an action for transitioning the vehicle from the current state to a second state by modifying at least one of the one or more constraints based on the autonomous assistance policy; and
autonomously operating, by the control module, one or more actuators onboard the vehicle in accordance with the automated response until the control scheme is able to solve for a path that satisfies the one or more constraints.

6. The method of claim 5, wherein identifying the assistance event comprises detecting at least one of a sensor anomaly, an environmental hazard, or a mechanical impairment.

7. The method of claim 5, wherein identifying the assistance event comprises detecting a path determined by the control scheme for autonomously operating the vehicle violates the one or more constraints associated with operating the vehicle.

8. The method of claim 5, further comprising providing an assistance request to the remote device over a network in response to the assistance event, wherein obtaining the autonomous assistance policy comprises receiving the autonomous assistance policy from the remote device over the network in response to the assistance request.

9. The method of claim 5, further comprising obtaining state data associated with the previous remote assistance requests from a plurality of vehicles, obtaining response data corresponding to the manual remote assistance responses to the remote assistance requests, determining a reward function for modifying vehicle states based on relationships between the state data and the response data using inverse reinforcement learning, and determining the autonomous assistance policy based on the reward function.

10. A non-transitory computer-readable medium having instructions stored thereon that are executable by the control module to perform the method of claim 5.

11. An autonomous vehicle control system comprising:
a database to maintain vehicle state data associated with previous remote assistance requests provided by a plurality of vehicles and assistance response data corresponding to manual remote assistance responses to the assistance requests; and
a server coupled to the database to determine a reward function for modifying vehicle states based on relationships between the state data and the response data for the sets of previous remote assistance requests and manual remote assistance responses previously provided for those previous remote assistance requests, determine an autonomous assistance policy for autonomously modifying vehicle states based on the reward function, and provide the autonomous assistance policy to at least one of the plurality of vehicles over a network, wherein one or more actuators onboard the at least one vehicle are autonomously operated in a manner that is influenced by the autonomous assistance policy when a control scheme for autonomously operating the at least one vehicle is unable to arrive at a solution for a path that satisfies one or more constraints associated with operating the vehicle by determining a current state of the at least one vehicle based at least in part on sensor data and determining an action for transitioning the at least one vehicle from the current state to a second state by modifying at least one of the one or more constraints based on the autonomous assistance policy until the control scheme is able to solve for a path that satisfies the one or more constraints.

12. The autonomous vehicle control system of claim 11, wherein the reward function is determined using inverse reinforcement learning.

13. The autonomous vehicle control system of claim 11, wherein the reward function is determined using a Markov decision process.

14. The autonomous vehicle control system of claim 11, wherein the server automatically pushes the autonomous assistance policy to the plurality of vehicles.

15. The autonomous vehicle control system of claim 11, wherein the server receives instances of the vehicle state data corresponding to respective assistance requests from the plurality of vehicles over the network and stores the instances of the vehicle state data in the database.

16. The autonomous vehicle control system of claim 15, wherein the server receives instances of the assistance response data corresponding to respective instances of the assistance responses from a plurality of remote computing devices over the network and stores the instances of the assistance response data in the database in association with respective instances of the vehicle state data associated with the respective assistant request corresponding to the respective assistance response.

17. The autonomous vehicle control system of claim 11, wherein the one or more actuators onboard the at least one vehicle are autonomously operated in a manner that is influenced by the autonomous assistance policy when a controller of the at least one vehicle identifies an assistance event based at least in part on the sensor data from one or more onboard sensor devices.

18. The method of claim 5, wherein determining the action for transitioning the vehicle from the current state to the second state by modifying at least one of the one or more constraints based on the autonomous assistance policy comprises modifying one or more lane boundaries.

19. The method of claim 5, further comprising verifying a probability of a human user initiating the action prior to autonomously operating the one or more actuators onboard the vehicle in accordance with the automated response.

20. The method of claim 5, further comprising determining the autonomous assistance policy based on sets of previous remote assistance requests and manual remote assistance responses previously provided for those previous remote assistance requests by:
  determining a reward function based on relationships between remote assistance request vehicle state data associated with the previous remote assistance requests and remote assistance response data corresponding to the manual remote assistance responses to the remote assistance requests by optimizing one or more weighting factors for transitioning between vehicle states; and
  determining the automated assistance policy based on the optimized reward function, wherein the automated assistance policy is configured to generate the action when applied to the current state that reflects the optimized reward function.

\* \* \* \* \*